Feb. 10, 1959  D. J. CUPEDO  2,872,820
STOP VALVE ACTUATING MECHANISM
Filed Feb. 18, 1957  2 Sheets-Sheet 2
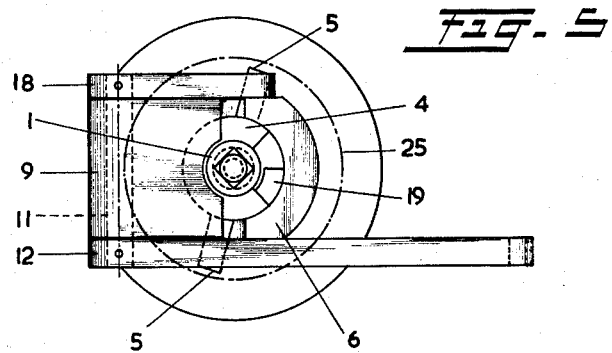
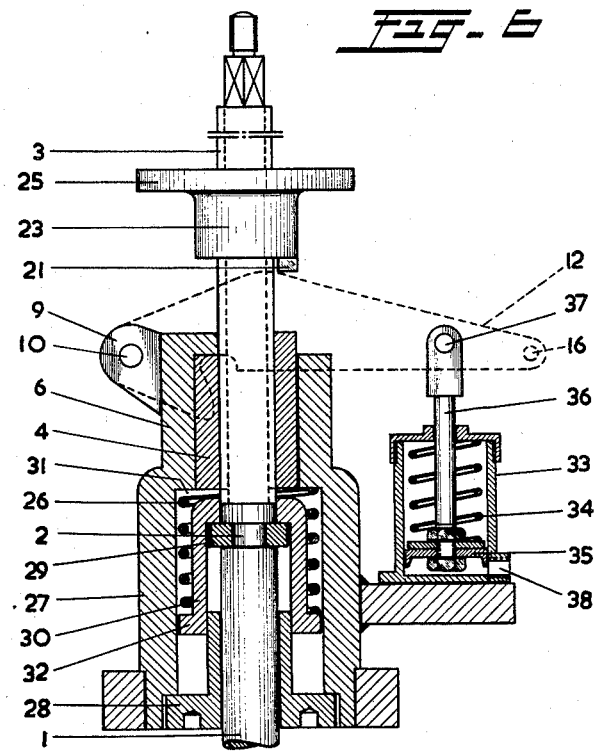
INVENTOR.
D. J. CUPEDO

United States Patent Office 2,872,820
Patented Feb. 10, 1959

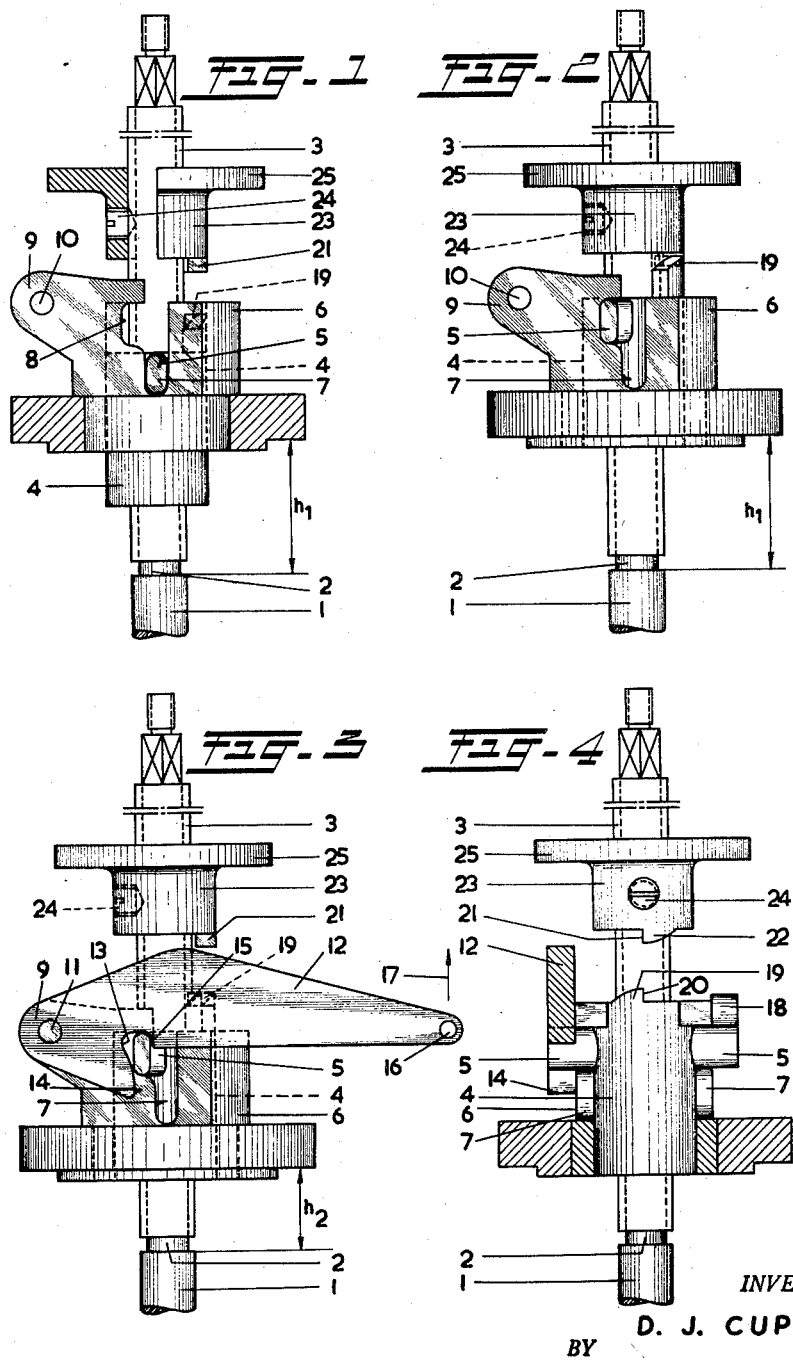

2,872,820

STOP VALVE ACTUATING MECHANISM

Douwe Janse Cupedo, Leidschendam, Netherlands

Application February 18, 1957, Serial No. 640,848

Claims priority, application Netherlands March 9, 1956

5 Claims. (Cl. 74—2)

The present invention relates to a stop valve actuating mechanism comprising a screw spindle to which a valve member may be connected and an axially guided nut cooperating with said spindle and adapted to be locked, said nut being adapted to be unlocked by means of a remote control lever to close the valve by the action of a spring.

A stop valve actuating mechanism of this type is known. However, the closing of this type of valve—which especially on board ships must admit of being effected rapidly from the bridge in emergency cases—requires too great forces. In addition the known stop valve actuating mechanism comprises a pawl which just as the lever is pivoted to the stop valve casing and which for locking the nut must be manually operated, said pawl being located just above the cover of the valve casing, so in a place where fouling will be liable to occur, so that accumulated filth may interfere with the movability of the pawl. An additional disadvantage of the known type of valve actuating mechanism is that the nut is guided by a guide way that is located eccentrically relative to the screw spindle, which after some wear and tear may lead to the nut warping and consequently to said nut being jammed in the guide way.

The object of this invention is to provide a stop valve actuating mechanism which does not have these disadvantages. To achieve this end according to the invention the stop valve actuating mechanism is so constructed that the nut is provided with at least one radial stud guided in a slot axially extending in a member surrounding said nut, which slot at the end remote from the valve comprises a tangential enlargement on one side, the stud being held in said enlargement upon being locked by said lever and being tangentially pushed out of said enlargement upon being unlocked.

This renders it possible to give the exterior of the nut a cylindrical shape and to arrange it in a cylindrical guiding member, in which guiding member also the slot or slots for the stud or studs of the nut are provided. More particularly when two diametrically opposite studs are used a very reliable guiding of the nut is obtained.

According to another feature of the invention the stop valve actuating mechanism may be so constructed that for bringing the nut in its locked position a ring provided with a projection is keyed onto said screen spindle, the nut being provided with a complementary projection, both projections having an axial face the height of which equals the pitch of the thread on the screw spindle, the arrangement being such that the projection on the ring is adapted to exert a tangential pressure on the projection on the nut when the stud of the nut is on a level with the enlargement of the slot.

In order to understand the purpose of this measure it should be borne in mind that after the valve has been automatically closed by the remote control lever the nut is in its lowermost position, which position is defined by the lower end of the slot in which the stud of the nut now lies. In order to enable the valve to be lifted again the nut is first to be brought in its locked position again, which is effected by turning the screw spindle clockwise, it being assumed that a right hand screw thread has been used. When the screw spindle is turned clockwise the nut is solely lifted until the screw spindle commences its last revolution. Now the nut has approached the ring which is axially and radially secured on the spindle, so closely that upon a further rotation of the spindle the two projections will run against each other so that at the end of said last revolution, the stud of the nut is pushed into the enlargement of the slot. The nut, therefore, is not only lifted during said last revolution but also slightly turned about its axis.

If the lever now locks the stud of the nut, which stud projects beyond the slot, the valve may be lifted of its seat by turning the screw spindle in counter-clockwise direction, the spring which is to effect the closing of the valve, being put under tension then. After one revolution of the spindle in counter-clockwise direction the projections on the nut and on the ring are removed from each other over such a distance that during the further turning of the spindle they can pass each other.

The stop valve is then ready again to be closed by remote control.

The invention will now be described with reference to the accompanying drawing. In this drawing the valve and the valve casing have not been shown.

Fig. 1 is an elevation and partly a sectional view of a portion of the stop valve actuating mechanism according to a first embodiment, the valve being closed and the mechanism being unlocked;

Fig. 2 is a corresponding showing, the mechanism, however, being in its locked position;

Fig. 3 is a corresponding showing, the valve, however, being opened;

Fig. 4 is a sectional view, turned through 90° relative to the showing according to Fig. 3;

Fig. 5 is a plan view of the stop valve actuating mechanism and

Fig. 6 is an elevation and partly a sectional view of a second embodiment of the stop valve actuating mechanism according to the invention;

In the figures reference numeral 1 designates the screw spindle at the lower end of which the valve member (not shown) is so secured, as to be rotatable, but fixed in axial direction. The lower end of the spindle and the valve have not been shown; the groove 2 forming the lower boundary of the screw thread 3 is an indicator for the position of the valve. The distance $h_1$ in Figs. 1 and 2 indicates that the valve bears on its seat; in Fig. 3 the distance $h_2$ which is smaller than $h_1$ indicates that the valve is open.

On the spindle 1 a nut 4 having a cylindrical circumference and two diametrically opposite radial studs 5 is screwed. The nut is surrounded by a cylindrical guiding member 6 provided with axial slots 7 for the studs 5, which slots at their end remote from the valve each have a tangential enlargement 8 in which the studs 5 are located when they are in their locked position (Figs. 2 and 3). The guiding member 6 furthermore carries a support 9 provided with a bore 10 for a pivot 11 by means of which a lever 12 (vide Figs. 3 and 5) is pivotally secured to the stop valve. Said lever is provided with a recess 13, which is adapted to receive the stud 5 and the flank 14 of which—which flank is closest to the pivot—extends in downward direction and is curved according to the arc of a circle the center of which is located eccentrically relative to the axis of the pivot 11. The short flank 15 of the recess acts as a latch on the stud 5.

The lever furthermore comprises an eye 16 for connecting to the lever means for lifting the lever according to the arrow 17. When the lever is lifted the stud 5 is released and is pushed in the direction of the slot 7 by the flank 14.

Fig. 5 shows that in case two diametrically opposite studs 5 are used a short lever 18 is connected to the lever 12 via the pivot 11, said second lever being provided with a recess corresponding with the recess 13, the former recess being the mirror-image of the latter recess.

At its upper side the nut 4 is provided with a projection 19 (especially vide Fig. 4) comprising an axial face 20, which face is adapted to engage an axial face 21 of a projection 22 forming part of a ring 23, which ring is fixed both tangentially and axially on the spindle 1, in this case by a clamping screw 24. The ring 23 comprises a flange 25 forming a supporting face for the upper side of the lever 12 in such a manner that by lifting said lever the valve can be lifted.

Fig. 6 shows the manner in which a helical spring 26 intended to close the valve after the nut 4 has been unlocked, is accommodated in a casing having a cylindrical wall 27 and a bottom 28 screwed therein. In this embodiment the guiding member 6 and the wall 27 are integral with each other. In the groove 2 a spring clip 29 projecting beyond the spindle is arranged, against which clip a bell-shaped support 30 for the spring 26 bears. The spring 26 bears with its end remote from said support against the end face 31 of the casing.

The support furthermore has a flange 32 adapted to move along the wall 27 with a slight clearance. If the interior of the casing is filled e. g. with oil, said flange 32 will act as a dampening piston during the closing movement of the valve. The dimensions have been so chosen that the nut 4 is adapted to slide into the spring 26. The lifting of the lever 12 may be effected by means of a hydraulic device which as shown in Fig. 6 may comprise a cylinder 33 having a piston 35 loaded by a spring 34, mounted therein. The piston rod 36 engages the lever 12 in 37. The reference numeral 38 designates the inlet for the oil under pressure of the cylinder 33.

It will be clear that the details of the invention admit of many variations without the scope of the invention being departed from.

I claim:

1. An actuating mechanism comprising a threaded spindle, a nut threaded on said spindle, a casing in which said nut is rotatable and is slidable in the direction of the axis of said spindle, spring means in said casing and connected to said spindle urging said spindle axially in one direction, said casing having at least one slot therein parallel to the axis of said spindle and having a tangential enlargement in the end thereof opposite the end toward which said spring means urges said spindle, at least one radially projecting stud on said nut projecting into said slot, and a locking lever pivoted in said casing and engageable with said stud for holding said stud in said tangential enlargement and urging the said stud out of said tangential enlargement and into said slot when said lever is moved from the locking position.

2. An actuating mechanism comprising a threaded spindle, a nut threaded on said spindle, a casing in which said nut is rotatable and is slidable in the direction of the axis of said spindle, spring means in said casing and connected to said spindle urging said spindle axially in one direction, said casing having at least one slot therein parallel to the axis of said spindle and having a tangential enlargement in the end thereof opposite the end toward which said spring means urges said spindle, at least one radially projecting stud on said nut projecting into said slot, and a locking lever pivoted in said casing and engageable with said stud for holding said stud in said tangential enlargement and urging the said stud out of said tangential enlargement and into said slot when said lever is moved from the locking position, and a ring fixed on said spindle and having a projection thereon, and a projection on said nut projecting toward said ring, said projections each having a face with a dimension in the axial direction of said spindle equal to the pitch of the thread on said spindle, said faces being engageable, whereby when said spindle is rotated when said stud is opposite said tangential enlargement the projection on said ring engages the projection on said nut and turns said nut to move said stud into said tangential enlargement.

3. An actuating mechanism as claimed in claim 2 in which said ring has a radially extending flange thereon engageable by said locking lever when said locking lever is moved from the locking position.

4. An actuating mechanism as claimed in claim 2 in which said lever is pivoted for pivotal movement about an axis which crosses the axis of the spindle at right angles thereto at the level of said tangential enlargement, said lever having a locking recess therein for holding said stud in said tangential enlargement, one of the sides of said recess being circular, the center of the circular curve of which is eccentric relative to the axis about which said lever is pivoted toward the open side of said recess, whereby when said lever is moved from the locking position said curved side will push said stud into said slot.

5. An actuating mechanism as claimed in claim 4 and a supporting ring fixed on said spindle, said spring means comprising a helical spring between said casing and said supporting ring, said ring being bell-shaped and having an edge spaced a small distance from the side wall of said casing, said side wall being cylindrical, and a removable bottom closing said casing, whereby the casing may be filled with oil and said bell-shaped ring will act as a damping piston during movement of said spindle.

References Cited in the file of this patent
UNITED STATES PATENTS

| | | |
|---|---|---|
| 956,595 | McKee | May 3, 1910 |
| 2,698,541 | Fox | Jan. 4, 1955 |